(12) United States Patent
Kamioka et al.

(10) Patent No.: US 10,017,138 B2
(45) Date of Patent: Jul. 10, 2018

(54) POWER SUPPLY MANAGEMENT SYSTEM AND POWER SUPPLY MANAGEMENT METHOD

(71) Applicants: Nozomu Kamioka, Tokyo (JP); Satoshi Wachi, Tokyo (JP); Toshiaki Date, Tokyo (JP); Shingo Yamaguchi, Tokyo (JP)

(72) Inventors: Nozomu Kamioka, Tokyo (JP); Satoshi Wachi, Tokyo (JP); Toshiaki Date, Tokyo (JP); Shingo Yamaguchi, Tokyo (JP)

(73) Assignee: Mitsubishi Electric Corporation, Tokyo (JP)

(\*) Notice: Subject to any disclaimer, the term of this patent is extended or adjusted under 35 U.S.C. 154(b) by 647 days.

(21) Appl. No.: 14/419,857

(22) PCT Filed: Oct. 18, 2012

(86) PCT No.: PCT/JP2012/076967
§ 371 (c)(1),
(2) Date: Feb. 5, 2015

(87) PCT Pub. No.: WO2014/061137
PCT Pub. Date: Apr. 24, 2014

(65) Prior Publication Data
US 2015/0203060 A1    Jul. 23, 2015

(51) Int. Cl.
*B60R 16/033*   (2006.01)
*H02J 7/16*    (2006.01)

(52) U.S. Cl.
CPC .............. *B60R 16/033* (2013.01); *H02J 7/16* (2013.01)

(58) Field of Classification Search
CPC ........................................ B60R 16/03–16/033
See application file for complete search history.

(56) References Cited

U.S. PATENT DOCUMENTS

2004/0112320 A1\* 6/2004 Bolz ................. F02N 11/04
                                          123/179.28
2006/0097577 A1\* 5/2006 Kato .................. F02N 11/0866
                                          307/10.1
(Continued)

FOREIGN PATENT DOCUMENTS

DE      10305939 A1 \* 8/2004 ............... B60L 7/12
JP      2004-328988 A    11/2004
(Continued)

OTHER PUBLICATIONS

International Search Report for PCT/JP2012/076967 dated Dec. 25, 2012.

*Primary Examiner* — Rexford Barnie
*Assistant Examiner* — David Shiao
(74) *Attorney, Agent, or Firm* — Sughrue Mion, PLLC; Richard C. Turner (57) ABSTRACT

A second switch (7) is provided between a first power supply circuit including a first capacitor (4) connected in series with a first switch (6) and a second power supply circuit including a second capacitor (5). In a case where a predetermined condition that necessitates supply of electric power from one power supply circuit to the other power supply circuit is established, the first switch (6) is opened to disconnect the first capacitor (4) in the first power supply circuit, and then the second switch (7) is closed to connect between the first power supply circuit and the second power supply circuit.

15 Claims, 4 Drawing Sheets

(56) References Cited

U.S. PATENT DOCUMENTS

| | | | |
|---|---|---|---|
| 2011/0001352 A1* | 1/2011 | Tamura | B60R 16/033 |
| | | | 307/9.1 |
| 2012/0150393 A1* | 6/2012 | Knight-Newbury | B60L 3/04 |
| | | | 701/45 |
| 2012/0158245 A1* | 6/2012 | Yoshizawa | B60R 16/03 |
| | | | 701/36 |
| 2012/0286569 A1* | 11/2012 | Pischke | B60R 16/03 |
| | | | 307/10.1 |

FOREIGN PATENT DOCUMENTS

| | | | | |
|---|---|---|---|---|
| JP | 2005-22561 A | 1/2005 | | |
| JP | 3972906 B2 | 6/2007 | | |
| JP | 2011-4556 A | 1/2011 | | |
| WO | WO 2011012428 A2 * | 2/2011 | | B60R 16/03 |
| WO | WO 2011046147 A1 * | 4/2011 | | B60R 16/03 |

\* cited by examiner

POWER SUPPLY MANAGEMENT SYSTEM AND POWER SUPPLY MANAGEMENT METHOD

CROSS REFERENCE TO RELATED APPLICATIONS

This application is a National Stage of International Application No. PCT/JP2012/076967 filed Oct. 18, 2012, the contents of which are incorporated herein by reference in their entirety.

TECHNICAL FIELD

The present invention relates to a power supply management system including a first power supply circuit and a second power supply circuit, which are configured as two different power supply systems, and to a power supply management method.

BACKGROUND ART

On the background of the problem of greenhouse gases on the earth, in order to reduce an amount of fuel consumption in a vehicle as much as possible, a number of technologies for reducing fuels required for generation by efficiently utilizing electric power have been proposed. One of such technologies is, for example, a power supply management system including two different power supply systems to enable efficient use of electric power required for driving an on-vehicle device (such as an electrical device in the vehicle).

A specific example of such related-art power supply management system is a system including a power supply circuit including a main power supply, and a power supply circuit including an auxiliary power supply, which are configured as two different power supply systems, the system opening and closing a bypass switch based on an operating state of a power converter in the system to control connection between the two power supply circuits (see, for example, Patent Literatures 1 and 2).

Moreover, in the related art described in Patent Literatures 1 and 2, especially in a case where the power converter in the system fails, the bypass switch is closed to connect between the two power supply circuits and thereby supply electric power from the power supply circuit on the high voltage side to the power supply circuit on the low voltage side. In this manner, the electric power is supplied to the on-vehicle device.

CITATION LIST

Patent Literature

[PTL 1] JP 3972906 B2
[PTL 2] JP 2005-022561 A

SUMMARY OF INVENTION

Technical Problem

However, the related art have the following problems.
In the related art described in Patent Literatures 1 and 2, as described above, the bypass switch is closed to connect between the two power supply circuits. At this time, when a voltage difference between the two power supply circuits is large, a large current flows through the bypass switch and the power supply circuit on the low voltage side, and hence the bypass switch, the on-vehicle device in the power supply circuit on the low voltage side, and the like fail (are burned). Therefore, there has been a problem of fear that an operation of the on-vehicle device in the system is stopped and the vehicle cannot continue traveling.

In addition, in the related art described in Patent Literatures 1 and 2, in a case where a predetermined condition that necessitates supply of electric power from one power supply circuit to the other power supply circuit is established due to some cause other than the failure of the power converter in the power supply management system, such condition cannot be addressed sufficiently, and as a result, the electric power is not stably supplied to the on-vehicle device in the system. Therefore, there has been a problem of fear that the operation of the on-vehicle device in the system is stopped and the vehicle cannot continue traveling.

The present invention has been made in order to solve the above-mentioned problems, and it is an object of the present invention to provide a power supply management system and a power supply management method which, even in a case where the predetermined condition that necessitates the supply of electric power from one power supply circuit to the other power supply circuit is established, allow the vehicle to continue stable traveling without stopping the operation of the on-vehicle device in the system.

Solution to Problem

According to one embodiment of the present invention, there is provided a power supply management system, including: a first power supply circuit including a generator motor and an electrical storage device, which are connected in parallel to each other, the electrical storage device including a first switch and a first capacitor, which are connected in series with each other, the first switch being normally in a conduction state; a second power supply circuit including accessories and a second capacitor, which are connected in parallel to each other; a second switch provided between the first power supply circuit and the second power supply circuit, the second switch being normally in a non-conduction state; a power converter for converting electric power between the first power supply circuit and the second power supply circuit during a driving operation; and a power supply management unit for switching, when it is determined that a predetermined condition that necessitates supply of electric power from one of the first power supply circuit and the second power supply circuit to another one thereof is established, the first switch from the conduction state to the non-conduction state to disconnect the first capacitor in the first power supply circuit, and then switching the second switch from the non-conduction state to the conduction state to connect between the first power supply circuit and the second power supply circuit.

Further, according to one embodiment of the present invention, there is provided a power supply management method to be executed in a power supply management system, the power supply management system including: a first power supply circuit including a generator motor and an electrical storage device, which are connected in parallel to each other, the electrical storage device including a first switch and a first capacitor, which are connected in series with each other, the first switch being normally in a conduction state; a second power supply circuit including accessories and a second capacitor, which are connected in parallel to each other; and a second switch provided between the first power supply circuit and the second power supply circuit, the second switch being normally in a non-conduction state, the power supply management method including: a first step of switching, when it is determined that a predetermined condition that necessitates supply of electric power from one of the first power supply circuit and the second power supply circuit to another one thereof is established, the first switch from the conduction state to the non-conduction state to disconnect the first capacitor in the first power supply circuit; and a second step of switching, after switching the first switch from the conduction state to the non-conduction state in the first step, the second switch from the non-conduction state to the conduction state to connect between the first power supply circuit and the second power supply circuit.

Advantageous Effects of Invention

According to the power supply management system and the power supply management method according to one embodiment of the present invention, the second switch is provided between the first power supply circuit including the first capacitor connected in series with the first switch and the second power supply circuit including the second capacitor, and in the case where the predetermined condition that necessitates the supply of electric power from one power supply circuit to the other power supply circuit is established, the first switch is opened to disconnect the first capacitor in the first power supply circuit, and then the second switch is closed to connect between the first power supply circuit and the second power supply circuit. In this manner, it is possible to obtain the power supply management system and the power supply management method which, even in the case where such predetermined condition is established, allow the vehicle to continue stable traveling without stopping the operation of the on-vehicle device in the system.

DESCRIPTION OF EMBODIMENT

Referring to the accompanying drawings, a power supply management system and a power supply management method according to an exemplary embodiment of the present invention are described below. Note that, in the drawings, the same elements are denoted by the same reference symbols and a redundant description is omitted.

First Embodiment

Figure 1:
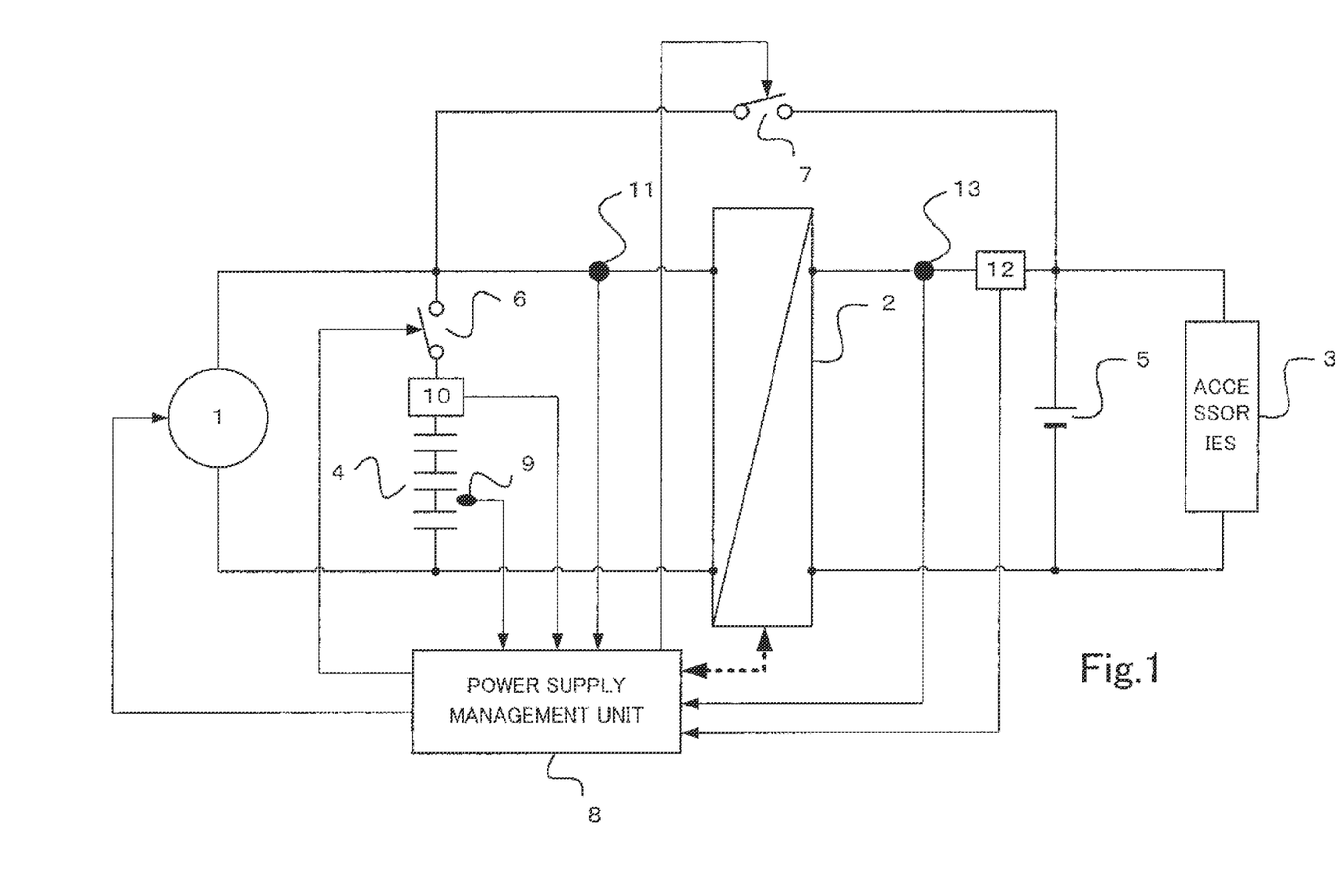
FIG. 1 is a configuration diagram illustrating a power supply management system according to a first embodiment of the present invention.

FIG. 1 is a configuration diagram illustrating a power supply management system according to a first embodiment of the present invention. The power supply management system in FIG. 1 includes a generator motor 1, a power converter 2, accessories 3, an electrical storage device including a first capacitor 4 and a first switch 6, a second capacitor 5, a second switch 7, a power supply management unit 8, a temperature detecting unit 9, a storage current detecting unit 10, an input terminal voltage detecting unit 11, an output current detecting unit 12, and an output terminal voltage detecting unit 13.

The generator motor 1 performs a generating operation and a driving operation. The generator motor 1 in the generating operation is applied torque from an engine (not shown) to supply electric power to the first capacitor 4, and supplies electric power that has been subjected to power conversion through the power converter 2 to the accessories 3 and the second capacitor 5. In addition, the generator motor 1 in the driving operation uses the electric power stored in the first capacitor 4 to apply torque to the engine and thereby start the engine.

In this configuration, the generator motor 1 and the electrical storage device, which are connected in parallel to each other, constitute a first power supply circuit, and the accessories 3 and the second capacitor 5, which are connected in parallel to each other, constitute a second power supply circuit. Moreover, the electrical storage device includes the first capacitor 4 and the first switch 6, which are connected in series with each other.

The power converter 2 in a driving operation converts input electric power to desired electric power to be output. In addition, the power converter 2 when stopped driving neither performs the power conversion nor outputs the electric power. Examples of the power converter 2 include, for example, a DC-DC converter. Note that, the form of the DC-DC converter may be any form such as a boost type, a buck type, a buck-boost type, or a bidirectional type.

The accessories 3 are a plurality of on-vehicle devices provided in a vehicle. Examples of the accessories 3 include, for example, a head light, an air conditioner, and an audio system.

The first capacitor 4 and the second capacitor 5 charge/discharge electric power. The first capacitor 4 stores the electric power supplied from the generator motor 1. In addition, the first capacitor 4 supplies the electric power that has been subjected to the power conversion through the power converter 2 to the accessories 3 and the second capacitor 5. The second capacitor 5 stores the electric power supplied from the generator motor 1 or the first capacitor 4. In addition, the second capacitor 5 supplies the electric power to the accessories 3. Note that, examples of the first capacitor 4 include, for example, a lithium ion battery and an electric double layer capacitor.

The first switch 6 is connected in series with the first capacitor 4. The first capacitor 4 performs the charging/discharging when the first switch 6 is switched to a conduction state, and is disconnected in the first power supply circuit and does not perform the charging/discharging when the first switch 6 is switched to a non-conduction state.

The second switch 7 is provided between the first power supply circuit and the second power supply circuit. The first power supply circuit and the second power supply circuit are connected when the second switch 7 is switched to the conduction state, and are disconnected when the second switch 7 is switched to the non-conduction state.

The power supply management unit 8 detects a temperature of the first capacitor 4 via the temperature detecting unit 9, and detects a current flowing through the first capacitor 4 and the first switch 6 via the storage current detecting unit 10. In addition, the power supply management unit 8 detects an input terminal voltage, an output current, and an output terminal voltage of the power converter 2 via the input terminal voltage detecting unit 11, the output current detecting unit 12, and the output terminal voltage detecting unit 13, respectively. Moreover, in a case where the operation of the first switch 6 is in the conduction state and the operation of the second switch 7 is in the non-conduction state, a voltage between terminals of the first capacitor 4 and the input terminal voltage of the power converter 2 become the same. Therefore, the power supply management unit 8 also detects the voltage between the terminals of the first capacitor 4 via the input terminal voltage detecting unit 11.

In addition, the power supply management unit 8 instructs the generator motor 1 to "generate electric power", "drive", or "stop the operation". Based on those instructions, the generator motor 1 performs the generating operation or the driving operation, or stops the operation.

In addition, the power supply management unit 8 instructs the power converter 2 to "drive" or "stop driving". Based on those instructions, the power converter 2 performs the driving operation or stops driving.

In addition, the power supply management unit 8 instructs the first switch 6 and the second switch 7 to switch to the non-conduction state or the conduction state. Based on those instructions, the first switch 6 and the second switch 7 is switched to the non-conduction state or the conduction state.

In addition, the power supply management unit 8 determines whether or not a predetermined condition that necessitates supply of electric power from one power supply circuit to the other power supply circuit (hereinafter simply referred to as predetermined condition) is established. When the predetermined condition is established, the power supply management unit 8 issues the operation instructions as described above to the generator motor 1, the power converter 2, the first switch 6, and the second switch 7 to connect between the first power supply circuit and the second power supply circuit.

Next, the predetermined condition determination performed by the power supply management unit 8 is described with reference to FIG. 2, which is a flowchart illustrating a procedure of predetermined condition determination processing performed by the power supply management unit 8 of the power supply management system according to the first embodiment of the present invention.

In this description, to give concrete examples of the predetermined condition determination performed by the power supply management unit 8, the description is given assuming a case where the power supply management unit 8 determines that the predetermined condition is established when at least one of the states as described in the following first to fourth conditions occurs. Note that, the first to fourth conditions are described here as the concrete examples of the predetermined condition, but the predetermined condition is not limited thereto. In other words, any condition may be employed as long as the condition necessitates supply of electric power from one power supply circuit to the other power supply circuit.

First Condition:
A state in which the power converter 2 has failed.
Second Condition:
A state in which the temperature of the first capacitor 4 is outside a predetermined temperature range.
Third Condition:
A state in which the first capacitor 4 stores sufficient electric power (fully-charged state).

Fourth Condition:
When the engine is started for the first time since the engine is stopped, and the first capacitor 4 is in a storage state that cannot start the engine immediately (the term "storage state" as used herein means, for example, a state in which a storage amount of the first capacitor 4 is reduced, or a state in which the voltage between the terminals of the first capacitor 4 is reduced).

In addition, in the case where the power supply management unit 8 determines that the predetermined condition is established (that is, the case where it is necessary to supply the electric power from one power supply circuit to the other power supply circuit), the power supply management unit 8 connects between the first power supply circuit and the second power supply circuit. On the other hand, in a case where the power supply management unit 8 determines that the predetermined condition is not established, the power supply management unit 8 does not connect between the first power supply circuit and the second power supply circuit.

Figure 2:
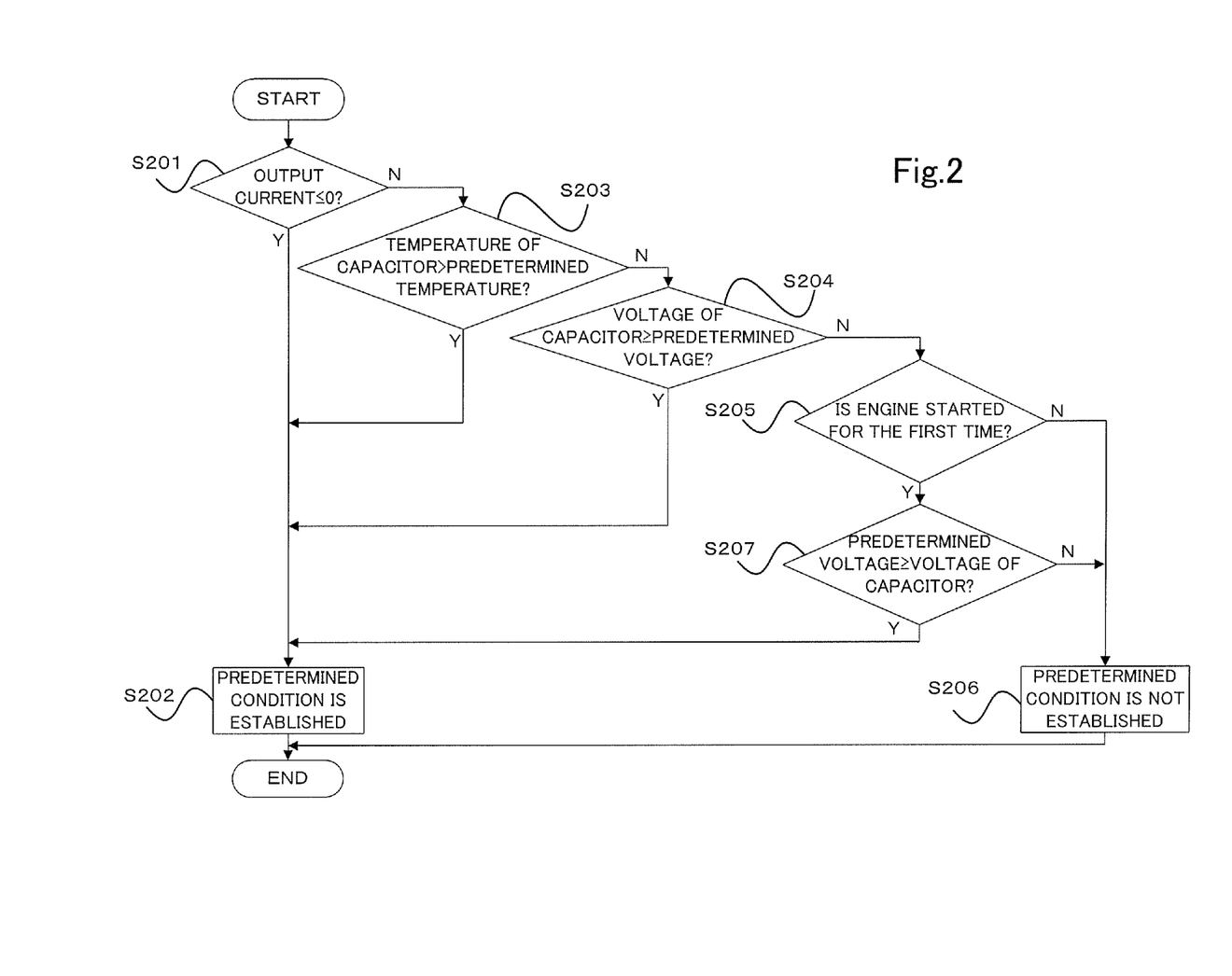
FIG. 2 is a flow chart illustrating a procedure of predetermined condition determination processing performed by a power supply management unit of the power supply management system according to the first embodiment of the present invention.

In the flow chart of FIG. 2, first in Step S201, the power supply management unit 8 determines whether an output current value of the power converter 2 detected by the output current detecting unit 12 is 0 or lower. In other words, in Step S201, the power supply management unit 8 determines whether or not the power converter 2 is in a failed state (the first condition is established) based on the output current value of the power converter 2.

When the power supply management unit 8 determines in Step S201 that the output current value is 0 or lower, the power supply management unit 8 determines in Step S202 that the predetermined condition is established, and ends the series of predetermined condition determination processing. On the other hand, when the power supply management unit 8 determines in Step S201 that the output current value is larger than 0, the processing proceeds to Step S203.

The power supply management unit 8 determines in Step S203 whether or not the temperature of the first capacitor 4 detected by the temperature detecting unit 9 is outside the predetermined temperature range. In other words, in Step S203, the power supply management unit 8 determines whether or not the temperature of the first capacitor 4 is in a state that is outside the predetermined temperature range (the second condition is established). Note that, there is an operating temperature range in accordance with the type of the capacitor, and the predetermined temperature range is defined in advance in accordance with the characteristics of the first capacitor 4.

When the power supply management unit 8 determines in Step S203 that the temperature of the first capacitor 4 is outside the predetermined temperature range, the power supply management unit 8 determines in Step S202 that the predetermined condition is established, and ends the series of predetermined condition determination processing. On the other hand, when the power supply management unit 8 determines in Step S203 that the temperature of the first capacitor 4 is within the predetermined temperature range, the processing proceeds to Step S204.

The power supply management unit 8 determines in Step S204 whether a value of the voltage between the terminals of the first capacitor 4 detected by the input terminal voltage detecting unit 11 is a first predetermined voltage value or higher. In other words, in Step S204, the power supply management unit 8 determines whether or not the first capacitor 4 is in a state that sufficient electric power is stored (the third condition is established). Note that, the first predetermined voltage value is defined in advance in accordance with the characteristics of the first capacitor 4.

When the power supply management unit 8 determines in Step S204 that the value of the voltage between the terminals of the first capacitor 4 is the first predetermined voltage value or higher, the power supply management unit 8 determines in Step S202 that the predetermined condition is established, and ends the series of predetermined condition determination processing. On the other hand, when the power supply management unit 8 determines in Step S204 that the value of the voltage between the terminals of the first capacitor 4 is below the first predetermined voltage value, the processing proceeds to Step S205.

Note that, the determination in Step S204 as to whether or not the third condition is established is not limited to the method described above. For example, when a generated voltage of the generator motor 1 is controlled by a rated voltage of the first capacitor 4, and when the current flowing through the first capacitor 4, which is detected by the storage current detecting unit 10, is within a predetermined current range (near 0), the power supply management unit 8 may determine that the third condition is established.

In addition, the power supply management unit 8 determines an open terminal voltage of the first capacitor 4 via the input terminal voltage detecting unit 11 immediately after the system is started from a system stop state of the vehicle. Further, with reference to a characteristic storage amount determined based on the open terminal voltage, the power supply management unit 8 determines the current storage amount based on an electrostatic capacity of the first capacitor 4 and an integrated value of a charge/discharge current of the first capacitor 4 detected by the storage current detecting unit 10. Then, when the thus-determined current storage amount is a predetermined storage amount or more, the power supply management unit 8 may determine that the third condition is established.

In other words, the power supply management unit 8 detects the storage state of the first capacitor 4, such as the voltage between the terminals and the storage amount of the first capacitor 4, and the current flowing through the first capacitor 4, via the storage state detecting unit. In addition, when in Step S204 the storage state of the first capacitor 4 becomes one of the above-mentioned states (first predetermined storage state) defined in advance, the power supply management unit 8 determines that the third condition is established. Note that, the storage state detecting unit detects the storage state of the first capacitor 4, and includes the storage current detecting unit 10, the input terminal voltage detecting unit 11, and the like.

In Step S205, the power supply management unit 8 determines whether or not the engine is started for the first time. In other words, the power supply management unit 8 determines in Step S205 whether or not the engine is in a state of being started for the first time (the fourth condition is established). Note that, the power supply management unit 8 determines whether or not the engine is in the state of being started for the first time based on, for example, information on the start of the engine input from an engine control unit (not shown) for controlling the engine.

When the power supply management unit 8 determines in Step S205 that the engine is not started for the first time, the power supply management unit 8 determines in Step S206 that the predetermined condition is not established, and ends the series of predetermined condition determination processing. On the other hand, when the power supply management unit 8 determines in Step S205 that the engine is started for the first time, the processing proceeds to Step S207.

In Step S207, the power supply management unit 8 determines whether the value of the voltage between the terminals of the first capacitor 4 detected by the input terminal voltage detecting unit 11 is a second predetermined voltage value or lower. In other words, in Step S207, the power supply management unit 8 determines whether or not the first capacitor 4 is in the storage state that cannot start the engine (the fourth condition is established). Note that, the second predetermined voltage value is defined in advance in accordance with the characteristics of the first capacitor 4 and the engine.

When the power supply management unit 8 determines in Step S207 that the value of the voltage between the terminals of the first capacitor 4 is the second predetermined voltage value or lower, the power supply management unit 8 determines in Step S202 that the predetermined condition is established, and ends the series of predetermined condition determination processing. On the other hand, when the power supply management unit 8 determines in Step S207 that the value of the voltage between the terminals of the first capacitor 4 is larger than the second predetermined voltage value, the power supply management unit 8 determines in Step S206 that the predetermined condition is not established, and ends the series of predetermined condition determination processing.

Note that, the determination on whether or not the fourth condition is established in Step S207 is not limited to the method described above. For example, the power supply management unit 8 includes a timer for counting time during which the system of the vehicle is stopped, and data storing a dark current while the system of the vehicle is stopped. In addition, the power supply management system 8 subtracts, from the storage amount of the first capacitor before the system of the vehicle is stopped, electric power consumed while the system of the vehicle is stopped, which is computed in accordance with the stop time counted by the timer and the dark current stored in the data, to thereby determine the current storage amount. Then, if the current storage amount is the predetermined storage amount or lower, the power supply management unit 8 may determine that the fourth condition is established.

In other words, when in Step S207 the storage state of the first capacitor 4, which is detected by the storage state detecting unit, becomes one of the above-mentioned states (second predetermined storage state) defined in advance, the power supply management unit 8 determines that the fourth condition is established.

As described above, the predetermined condition that can occur in the power supply management system is defined in advance, and the power supply management unit 8 performs the predetermined condition determination processing. In this manner, the power supply management unit 8 may determine whether or not the predetermined condition defined in advance is established in the system.

Figure 3:
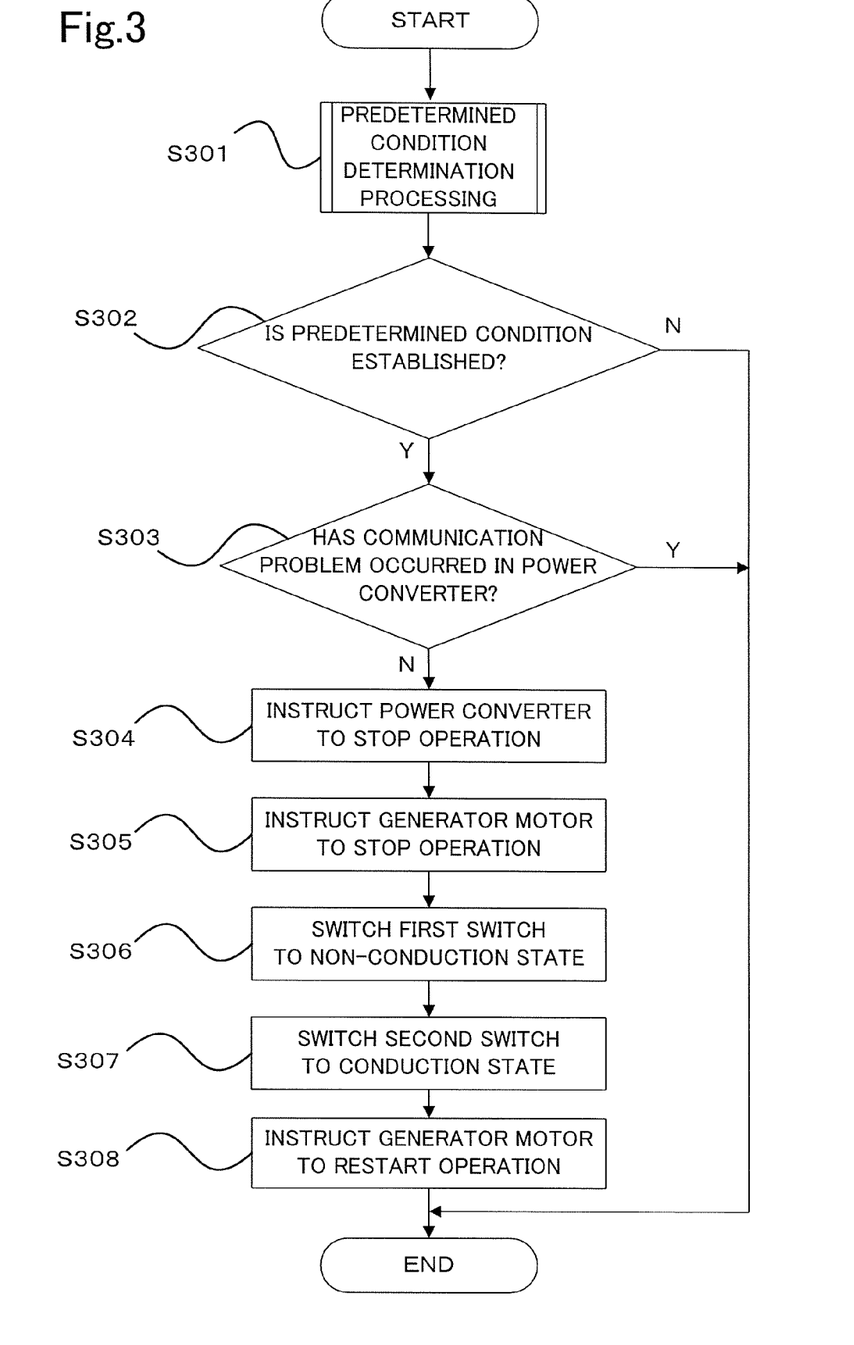
FIG. 3 is a flow chart illustrating a procedure of operation instruction processing performed by the power supply management unit of the power supply management system according to the first embodiment of the present invention.

Next, operation instruction processing performed by the power supply management unit 8 on the generator motor 1, the power converter 2, the first switch 6, and the second switch 7 is described with reference to a flow chart of FIG. 3. FIG. 3 is a flow chart illustrating a procedure of the operation instruction processing performed by the power supply management unit 8 of the power supply management system according to the first embodiment of the present invention.

In the flow chart of FIG. 3, first, the power supply management unit 8 performs the above-mentioned predetermined condition determination processing (corresponding to FIG. 2 above) in Step S301. Next, the power supply management unit 8 performs in Step S302 the predetermined condition determination processing to determine whether or not the predetermined condition is established.

When the power supply management unit 8 determines in Step S302 that the predetermined condition is established, the processing proceeds to Step S303. On the other hand, when the power supply management unit 8 determines in Step S302 that the predetermined condition is not established, the power supply management unit 8 ends the series of operation instruction processing.

The power supply management unit 8 determines in Step S303 whether or not a communication problem has occurred in the power converter 2. When the power supply management unit 8 determines in Step S303 that no communication problem has occurred, the processing proceeds to Step S304. On the other hand, when the power supply management unit 8 determines that a communication problem has occurred, the power supply management unit 8 ends the series of operation instruction processing.

In Step S304, the power supply management unit 8 instructs the power converter 2 to "stop driving". Next in Step S305, the power supply management unit 8 instructs the generator motor 1 to "stop the operation".

In Step S306, the power supply management unit 8 instructs the first switch 6 to switch from the conduction state to the non-conduction state. Next in Step S307, the power supply management unit 8 instructs the second switch 7 to switch from the non-conduction state to the conduction state.

In Step S308, the power supply management unit 8 instructs the generator motor 1 to restart the operation ("generation" or "driving"), and ends the series of operation processing. Note that, in a case where the operation of the generator motor 1 is changed from generation to stop in Step S305, the power supply management unit 8 instructs "generation" in Step S308. On the other hand, in a case where the operation of the generator motor 1 is changed from driving to stop in Step S305, the power supply management unit 8 instructs "driving" in Step S308.

Figure 4:
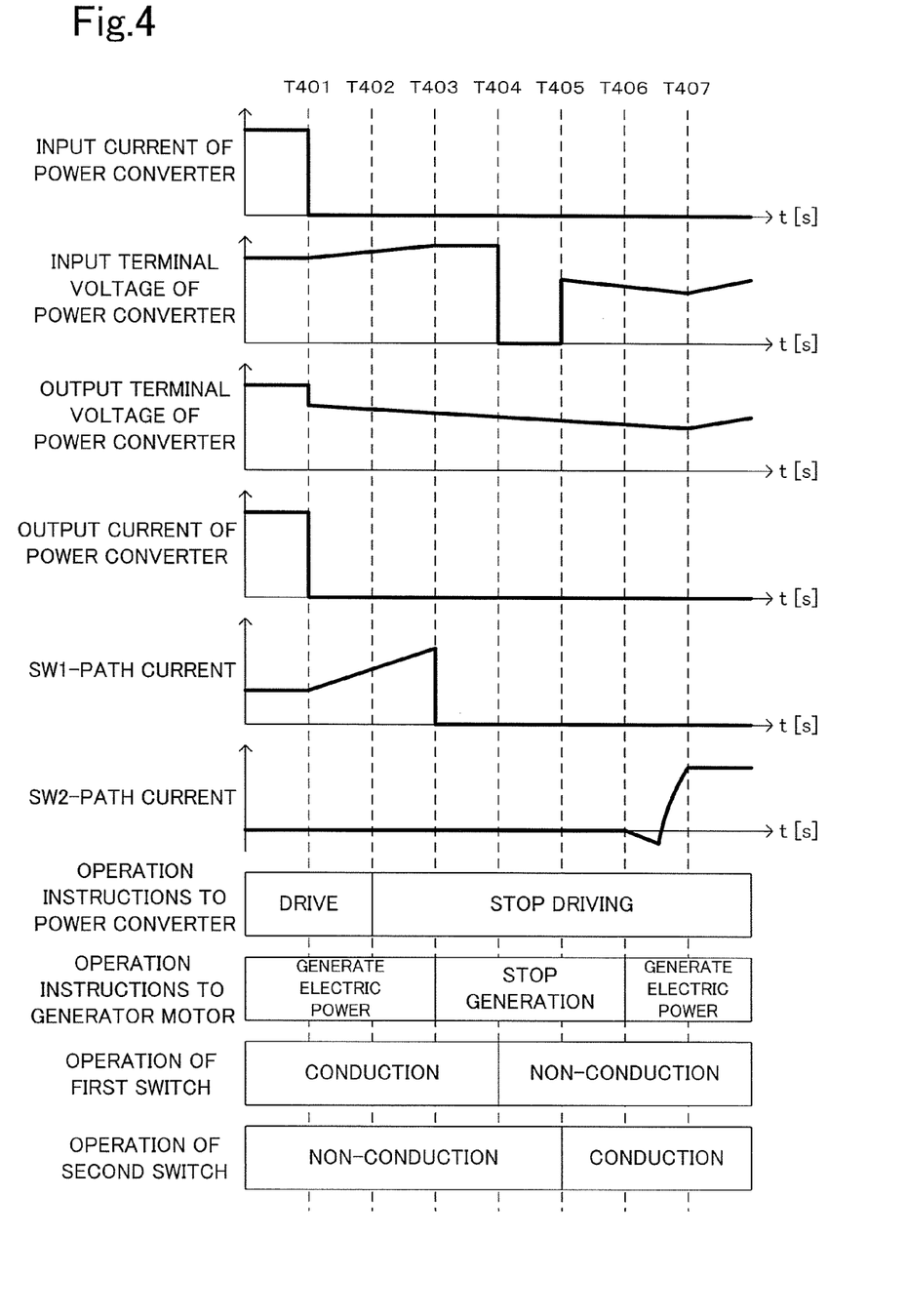
FIG. 4 is a timing chart illustrating the operation instruction processing performed by the power supply management unit of the power supply management system according to the first embodiment of the present invention.

Next, the operation instructions issued by the power supply management unit 8 at respective times, which have been described in the flow charts of FIGS. 2 and 3 above, are described with reference to FIG. 1 above and FIG. 4. FIG. 4 is a timing chart illustrating the operation instruction processing performed by the power supply management unit 8 of the power supply management system according to the first embodiment of the present invention.

The horizontal axes of the timing chart of FIG. 4 represent time. Moreover, the vertical axes of the timing chart represent, in order from above, the input current of the power converter 2, the input terminal voltage of the power converter 2, the output terminal voltage of the power converter 2, the output current of the power converter 2, a SW1-path current (current flowing through the first switch 6), a SW2-path current (current flowing through the second switch 7), the operation instructions to the power converter 2, the operation instructions to the generator motor 1, the operation instructions to the first switch 6, and the operation instructions to the second switch 7, respectively.

Note that, in this description, to give concrete examples, the following cases (1) and (2) are assumed in describing the operation instructions issued by the power supply management unit 8. Moreover, the timing chart of FIG. 4 is used to describe the operation principle of the present invention in detail, and the present invention is not limited to the operation.

(1) The first power supply circuit is on the high voltage side, and the second power supply circuit is on the low voltage side.

(2) In the case where the generator motor 1 performs the generating operation, the power supply management unit 8 determines that the power converter 2 is in the failed state (the first condition is established).

As shown in FIG. 4, before time t=T401, as can be seen from values of the input current, the input terminal voltage, the output terminal voltage, and the output current of the power converter 2, the power supply management system is in a normal state. Therefore, the power supply management unit 8 determines that the predetermined condition is not established. Moreover, when the predetermined condition is not established, the first switch 6 operates in the conduction state, and the second switch 7 operates in the non-conduction state (in other words, the first switch 6 is normally in the conduction state, and the second switch 7 is normally in the non-conduction state).

In addition, the generator motor 1 performs the generating operation to supply the electric power to the first capacitor 4, and supplies the electric power that has been converted through the power converter 2 to the accessories 3 and the second capacitor 5. Further, the generator motor 1 is applied torque corresponding to the generated current from the engine.

At time t=T401, in a case where a failure occurs in the power converter 2 due to some reason, the input current and the output current of the power converter 2 decrease to 0.

The output terminal voltage of the power converter 2 becomes equal to the voltage between the terminals of the second capacitor 5, and hence decreases to the voltage between the terminals of the second capacitor 5. In addition, the amount of electric power supplied from the first power supply circuit becomes zero, and hence the second capacitor 5 supplies the electric power to the accessories 3. Therefore, the voltage between the terminals of the second capacitor 5 gradually decreases, and the output terminal voltage of the power converter 2 also gradually decreases.

The input terminal voltage of the power converter 2 becomes equal to the voltage between the terminals of the first capacitor 4, and hence increases to the voltage between the terminals of the first capacitor 4. In addition, the amount of electric power supplied to the second power supply circuit becomes zero, and further, the amount of electric power consumed in the power converter 2 also becomes zero. Therefore, the generator motor 1 supplies excessive electric power to the first capacitor 4. In accordance therewith, a current flowing into the first capacitor 4 gradually increases. Therefore, the voltage between the terminals of the first capacitor 4 gradually increases, and the input terminal voltage of the power converter 2 gradually increases.

In addition, as described above, the current flowing into the first capacitor 4 gradually increases, and hence the SW1-path current also gradually increases.

At time t=T402, the power supply management unit 8 determines that it is a state in which a failure has occurred in the power converter 2 (that is, the first condition is established). In this case, the power supply management unit 8 instructs the power converter 2 to "stop driving".

At time t=T403, the power supply management unit 8 instructs the generator motor 1 to "stop the operation (stop generation)". In this case, no current flows from the first capacitor 4 into the generator motor 1, and hence the SW1-path current decreases to 0. In addition, the voltage of the first capacitor 4 does not gradually increase but becomes constant, and hence the input terminal voltage of the power converter 2 also becomes constant.

At time t=T404, the power supply management unit 8 instructs the first switch 6 to switch from the conduction state to the non-conduction state. In this case, the first capacitor 4 is disconnected in the first power supply circuit, and hence the input terminal voltage of the power converter 2 decreases to 0.

At time t=T405, the power supply management unit 8 instructs the second switch 7 to switch from the non-conduction state to the conduction state. In this case, the first power supply circuit and the second power supply circuit are connected, and hence the input terminal voltage and the output terminal voltage of the power converter 2 become equal. Therefore, the input terminal voltage of the power converter 2 increases from 0 to a voltage that is equal to the output terminal voltage of the power converter 2.

In addition, as described above, the second capacitor 5 supplies the electric power to the accessories 3, and hence the output terminal voltage of the power converter 2 gradually decreases. Therefore, the input terminal voltage of the power converter 2 also increases from 0 to the voltage that is equal to the output terminal voltage of the power converter 2, and then gradually decreases as the output terminal voltage of the power converter 2.

At time t=T406, the power supply management unit 8 instructs the generator motor 1 to "generate electric power". In this case, the electric power stored in the second capacitor 5 is used, and a current (field current) flows from the second capacitor through the second switch 7 into the generator motor 1.

Therefore, the SW2-path current gradually increases in a negative direction as shown in FIG. 4. In addition, when the current generated by the generator motor 1 increases, the current flows from the generator motor 1 into the second power supply circuit, and hence the SW2-path current gradually increases in a positive direction.

At time t=T407, the generator motor 1 enters a stable generation state, and the generated current reaches a predetermined value. When the generated current reaches the predetermined value, the electric power can be supplied stably from the generator motor 1 to the second capacitor 5 and the accessories 3. In addition, the storage amount of the second capacitor 5 increases, and hence the voltage between the terminals increases. Therefore, as shown in FIG. 4, the input terminal voltage and the output terminal voltage of the power converter 2 also increase in a similar manner.

As described above, the power supply management unit 8 instructs the first switch 6 to switch to the non-conduction state and then instructs the second switch 7 to switch to the conduction state, with the result that the first power supply circuit and the second power supply circuit are connected. This prevents a large current from flowing in the second switch 7 and the power supply circuit on the low voltage side, with the result that the on-vehicle device in the system may be protected, and the electric power is supplied from the generator motor 1 to the second power supply circuit. Therefore, the vehicle may continue stable traveling without stopping the operation of the on-vehicle device in the system.

Note that, in this description, the concrete examples have been referenced to describe the series of operation instructions issued by the power supply management unit 8, but the present invention is not limited thereto. More specifically, even in the case where the power supply management unit 8 determines that one of the second to fourth conditions described above is established, the power supply management unit 8 issues a similar series of operation instructions. The series of operation instructions issued by the power supply management unit 8 is described below for each condition.

Second Condition:

In the case where the temperature of the first capacitor 4 changes to the state outside the predetermined temperature range, in the related arts, the first capacitor 4 continues charging/discharging, and hence it has been impossible to quickly reduce the temperature of the first capacitor 4. Therefore, degradation of the first capacitor 4 progresses to eventually lead to the failure of the first capacitor 4, resulting in a problem of fear that the operation of the on-vehicle device in the system is stopped and the vehicle cannot continue traveling.

Therefore, in the first embodiment, in the case where the power supply management unit 8 determines that the second condition is established, the power supply management unit 8 instructs the first switch 6 to switch to the non-conduction state and then instructs the second switch 7 to switch to the conduction state, with the result that the first power supply circuit and the second power supply circuit are connected.

This stops the charging/discharging of the first capacitor 4, and hence the temperature of the first capacitor 4 may be reduced quickly. Therefore, the first capacitor 4 may be protected, and at the same time, the electric power is supplied from the generator motor 1 to the second power supply circuit. As a result, the vehicle may continue stable traveling without stopping the operation of the on-vehicle device in the system.

Third Condition:

In the case where the first capacitor 4 stores sufficient electric power, in the related art, the first capacitor 4 is continued to be charged/discharged, and hence unnecessary charging/discharging is repeated. Therefore, degradation of the first capacitor 4 progresses to eventually lead to the failure of the first capacitor 4, resulting in a problem of fear that the operation of the on-vehicle device in the system is stopped and the vehicle cannot continue traveling.

Therefore, in the first embodiment, in the case where the power supply management unit 8 determines that the third condition is established, the power supply management unit 8 instructs the first switch 6 to switch to the non-conduction state and then instructs the second switch 7 to switch to the conduction state, with the result that the first power supply circuit and the second power supply circuit are connected.

This stops the charging/discharging of the first capacitor 4, and hence the unnecessary charging/discharging is not repeated. Therefore, the first capacitor 4 may be protected, and at the same time, the electric power is supplied from the generator motor 1 to the second power supply circuit. As a result, the vehicle may continue stable traveling without stopping the operation of the on-vehicle device in the system.

Fourth Condition:

In the case where the engine is started for the first time since the engine is stopped and the first capacitor 4 is in the storage state that cannot start the engine, in the related art, it is contemplated that the second capacitor 5 supplies electric power to the first capacitor 4 to increase the storage amount of the first capacitor. However, there is a possibility that the voltage between the terminals of the first capacitor 4 is leveled and becomes lower than a voltage necessary to start the engine. Therefore, there has been a problem of fear that the engine cannot be started and the vehicle cannot continue traveling.

Therefore, in the first embodiment, in the case where the power supply management unit 8 determines that the fourth condition is established, the power supply management unit 8 instructs the first switch 6 to switch to the non-conduction state and then instructs the second switch 7 to switch to the conduction state, with the result that the first power supply circuit and the second power supply circuit are connected.

This allows the electric power stored in the second capacitor 5 to be used directly to start the engine. Therefore, the engine may be started without the possibility of the voltage becoming lower than the voltage necessary to start the engine, and the electric power is supplied from the generator motor 1 to the second power supply circuit, with the result that the vehicle may continue stable traveling without stopping the operation of the on-vehicle device in the system.

Note that, in a case where the generator motor 1 is not in the generating operation but in the driving operation, and in a case where the power supply management unit 8 determines that one of the first to fourth conditions is established and issues the series of operation instructions as described above, similar effects may be obtained.

More specifically, when the power supply management unit 8 issues similar operation instructions to connect between the first power supply circuit and the second power supply circuit, the electric power is supplied from the second capacitor 5 to the generator motor 1, and hence the vehicle may continue stable traveling without stopping the operation of the on-vehicle device in the system. Note that, in this case, when the storage amount of the second capacitor 5 is decreased to a predetermined amount, the power supply management unit 8 switches the operation of the generator motor 1 from the driving operation to the generating operation.

In addition, in the first embodiment, the power supply management unit 8 stops driving of the power converter 2 before switching the first switch 6 to the non-conduction state. In this manner, in the first condition, in a case where the failure of the power converter 2 is a failure in which the power converter 2 is repeatedly turned on and off, for example, it is possible to prevent the power converter 2 from being suddenly switched from off to on and the output terminal voltage of the power converter 2 from being suddenly changed. Further, in the second to fourth conditions, in a case where the power supply management unit 8 stops driving of the power converter 2 and then switches the second switch 7 to the conduction state, the electric current does not flow into the power converter 2. Therefore, the power consumption in the power converter 2 may be suppressed.

In addition, in the first embodiment, the power supply management unit 8 causes the generator motor 1 to stop generation or driving before switching the first switch 6 to the non-conduction state. In this manner, in a state in which the first capacitor 4 is charging/discharging, the first switch 6 is not switched to the conduction state, and hence generation of arc in the switch unit may be prevented.

In addition, in the first embodiment, in the case where the power supply management unit 8 causes the generator motor 1 to stop generation or driving, the power supply management unit 8 switches the second switch 7 to the conduction state and then causes the generator motor 1 to restart generation or driving. In this manner, in the state in which the generator motor 1 is performing the generating operation or the driving operation, the second switch 7 is not switched to the conduction state, and hence the occurrence of the failure in the switch unit may be prevented more reliably.

As described above, according to the first embodiment of the present invention, the second switch is provided between the first power supply circuit including the first capacitor connected in series with the first switch and the second power supply circuit including the second capacitor, in the case where the predetermined condition that necessitates the supply of electric power from one power supply circuit to the other power supply circuit is established, the power supply management unit switches the first switch to the non-conduction state to disconnect the first capacitor in the first power supply circuit, and then switches the second switch to the conduction state to connect between the first power supply circuit and the second power supply circuit. In this manner, even in the case where such predetermined condition is established, the vehicle may continue stable driving without stopping the operation of the on-vehicle device in the system.

REFERENCE SIGNS LIST

1 generator motor, 2 power converter, 3 accessories, 4 first capacitor, 5 second capacitor, 6 first switch, 7 second switch, 8 power supply management unit, 9 temperature detecting unit, 10 storage current detecting unit, 11 input terminal voltage detecting unit, 12 output current detecting unit, 13 output terminal voltage detecting unit

The invention claimed is:

1. A power supply management system, comprising:
    a first power supply circuit including a generator motor and an electrical storage device that is connected to the generator motor in parallel, the electrical storage device including a first switch and a first capacitor that is connected to the first switch in series, the first switch being in a conduction state when a predetermined condition is not satisfied;
    a second power supply circuit including accessories and a second capacitor that is connected to the accessories in parallel;
    a second switch disposed between the first power supply circuit and the second power supply circuit, the second switch being in a non-conduction state when the predetermined condition is not satisfied;
    a power converter to convert electric power between the first power supply circuit and the second power supply circuit during a driving operation of the power converter, the power converter including input terminals connected in parallel with the series-connected first capacitor and the first switch; and
    a power supply management controller to switch the first switch from the conduction state to the non-conduction state to disconnect the first capacitor in the first power supply circuit in response to the predetermined condition being satisfied, and switch the second switch from the non-conduction state to the conduction state to connect between the first power supply circuit and the second power supply circuit after switching the first switch from the conduction state to the non-conduction state so that the electric power is supplied from the first power supply circuit to the second power supply circuit or from the second power supply circuit to the first power supply circuit, so as to prevent a current greater than a threshold current level from flowing to the second power supply circuit.

2. The power supply management system according to claim 1, wherein before switching the first switch from the conduction state to the non-conduction state, the power supply management controller stops the power converter from performing the driving operation.

3. The power supply management system according to claim 2, wherein before switching the first switch from the conduction state to the non-conduction state, the power supply management controller stops a generating operation of the generator motor in response to the generator motor performing the generating operation, and stops a driving operation of the generator motor in response to the generator motor performing the driving operation.

4. The power supply management system according to claim 3, wherein when the power supply management controller stops the generating operation, the power supply management controller restarts the stopped generating operation after switching the second switch from the non-conduction state to the conduction state, and when the power supply management controller stops the driving operation, the power supply management controller restarts the stopped driving operation after switching the second switch from the non-conduction state to the conduction state.

5. The power supply management system according to claim 2, wherein when the power converter fails, the power supply management controller determines that the predetermined condition is established.

6. The power supply management system according to claim 2, further comprising a temperature detecting detector to detect a temperature of the first capacitor,
wherein the power supply management controller determines, when the temperature of the first capacitor detected by the temperature detecting detector is outside a predetermined temperature range that is defined in advance, that the predetermined condition is established.

7. The power supply management system according to claim 2, further comprising a storage state detector to detect a storage state of the first capacitor,
wherein the power supply management controller determines, when the storage state of the first capacitor detected by the storage state detector becomes a first predetermined storage state that is defined in advance, that the predetermined condition is established.

8. The power supply management system according to claim 2, further comprising a storage state detector to detect a storage state of the first capacitor,
wherein the power supply management controller determines, when an engine is started for the first time since the engine has stopped and the storage state of the first capacitor detected by the storage state detector becomes a second predetermined storage state that is defined in advance, that the predetermined condition is established.

9. The power supply management system according to claim 1, wherein before switching the first switch from the conduction state to the non-conduction state, the power supply management controller stops a generating operation of the generator motor in response to the generator motor performing the generating operation, and stops a driving operation of the generator motor in response to the generator motor performing the driving operation.

10. The power supply management system according to claim 9, wherein when the power supply management controller stops the generating operation, the power supply management controller restarts the stopped generating operation after switching the second switch from the non-conduction state to the conduction state, and when the power supply management controller stops the driving operation, the power supply management controller restarts the stopped driving operation after switching the second switch from the non-conduction state to the conduction state.

11. The power supply management system according to claim 1, wherein when the power converter fails, the power supply management controller determines that the predetermined condition is established.

12. The power supply management system according to claim 1, further comprising a temperature detector to detect a temperature of the first capacitor,
wherein the power supply management controller determines, when the temperature of the first capacitor detected by the temperature detector is outside a predetermined temperature range that is defined in advance, that the predetermined condition is established.

13. The power supply management system according to claim 1, further comprising a storage state detector to detect a storage state of the first capacitor,
wherein the power supply management controller determines, when the storage state of the first capacitor detected by the storage state detector becomes a first predetermined storage state that is defined in advance, that the predetermined condition is not established.

14. A power supply management system, comprising:
a first power supply circuit including a generator motor and an electrical storage device that is connected to the generator motor in parallel, the electrical storage device including a first switch and a first capacitor that is connected to the first switch in series, the first switch being in a conduction state when a predetermined condition is not satisfied;
a second power supply circuit including accessories and a second capacitor that is connected to the accessories in parallel;
a second switch disposed between the first power supply circuit and the second power supply circuit, the second switch being in a non-conduction state when the predetermined condition is not satisfied;
a power converter to convert electric power between the first power supply circuit and the second power supply circuit during a driving operation of the power converter;
a power supply management controller to switch the first switch from the conduction state to the non-conduction state to disconnect the first capacitor in the first power supply circuit, and switch the second switch from the non-conduction state to the conduction state to connect between the first power supply circuit and the second power supply circuit, in response to the predetermined condition being satisfied, so that electric power is supplied from the first power supply circuit to the second power supply circuit or from the second power supply circuit to the first power supply circuit; and
a storage state detector to detect a storage state of the first capacitor,
wherein the power supply management controller determines, when an engine is started for the first time since the engine has stopped and the storage state of the first capacitor detected by the storage state detector becomes a second predetermined storage state that is defined in advance, that the predetermined condition is established.

15. A power supply management method to be executed in a power supply management system,
the power supply management system comprising:
a first power supply circuit including a generator motor and an electrical storage device that is connected to the generator motor in parallel, the electrical storage device including a first switch and a first capacitor that is connected to the first switch in series, the first switch being in a conduction state when a predetermined condition is not satisfied;
a second power supply circuit including accessories and a second capacitor that is connected to the accessories in parallel;
a second switch disposed between the first power supply circuit and the second power supply circuit, the second switch being in a non-conduction state when the predetermined condition is not satisfied; and
a power converter to convert electric power between the first power supply circuit and the second power supply circuit during a driving operation of the power converter, the power converter including input terminals connected in parallel with the series-connected first capacitor and the first switch, the power supply management method comprising:
a first step of switching the first switch from the conduction state to the non-conduction state to disconnect the first capacitor in the first power supply circuit in response to the predetermined condition being satisfied; and
a second step of switching, after switching the first switch from the conduction state to the non-conduction state in the first step, the second switch from the non-conduction state to the conduction state to connect between the first power supply circuit and the second power supply circuit so that electric power is supplied from the first power supply circuit to the second power supply circuit or from the second power supply circuit to the first power supply circuit to prevent a current greater than a threshold current level from flowing to the second power supply circuit.

* * * * *